(12) United States Patent
Jakobsson et al.

(10) Patent No.: US 7,213,012 B2
(45) Date of Patent: May 1, 2007

(54) OPTIMIZER DYNAMIC SAMPLING

(75) Inventors: Hakan Jakobsson, San Francisco, CA (US); William McKenna, Santa Cruz, CA (US); Mohamed Ziauddin, Pleasanton, CA (US)

(73) Assignee: Oracle International Corporation, Redwood Shores, CA (US)

( * ) Notice: Subject to any disclaimer, the term of this patent is extended or adjusted under 35 U.S.C. 154(b) by 466 days.

(21) Appl. No.: 10/435,228

(22) Filed: May 9, 2003

(65) Prior Publication Data

US 2004/0225639 A1 Nov. 11, 2004

(51) Int. Cl.
*G06F 17/30* (2006.01)

(52) U.S. Cl. .............................. 707/2; 707/3
(58) Field of Classification Search ............ 707/1, 707/2, 3
See application file for complete search history.

(56) References Cited

U.S. PATENT DOCUMENTS

| | | | | | |
|---|---|---|---|---|---|
| 6,012,064 | A * | 1/2000 | Gibbons et al. | ........ | 707/103 R |
| 6,353,826 | B1 * | 3/2002 | Seputis | ........... | 707/5 |
| 6,745,652 | B2 * | 6/2004 | Bestgen et al. | ........... | 707/3 |
| 6,801,905 | B2 * | 10/2004 | Andrei | ........... | 707/2 |
| 6,934,695 | B2 * | 8/2005 | Kase et al. | ........... | 706/45 |
| 7,007,009 | B2 * | 2/2006 | Bestgen et al. | ........... | 707/3 |
| 7,010,521 | B2 * | 3/2006 | Hinshaw et al. | ........... | 707/3 |

OTHER PUBLICATIONS

Barlos et al, "On the Development of a Site Selection Optimizer for Distributed and Parallel Database Systems", ACM 1993, pp. 684-693.*

(Continued)

*Primary Examiner*—Uyen Le
(74) *Attorney, Agent, or Firm*—Hickman Palermo Truong & Becker LLP (57) ABSTRACT

Described herein are approaches to implementing dynamic sampling in a way that lessens or eliminates the additional overhead incurred to perform dynamic sampling. Also described are techniques for determining characteristics about predicates not previously determined by conventional techniques for dynamic sampling. Dynamic sampling is used by a query optimizer to dynamically estimate predicate selectivities and statistics. When a database statement is received by a database server, an initial analysis of the database statement is made to determine the efficacy of dynamic sampling, that is, to determine whether optimization of the query would benefit from dynamic sampling and whether performance is not excessively impacted by the dynamic sampling process. If this analysis determines dynamic sampling should be used, then dynamic sampling is undertaken.

56 Claims, 7 Drawing Sheets

OTHER PUBLICATIONS

Hsu et al, "Semantic Query Optimization for Query Plans of Heterogeneous Multi Database Systems", IEEE 2000, pp. 959-978.*

Ng et al, "On Reconfiguring Query Execution Plans in Distributed Object-Relational DBMS", Parallel and Distributed Systems, 1998 Proceedings, 1998 International Conference on, Publication Date: Dec. 14-16, 1998, pp. 59-66.*

Frank Olken et al., "Random Sampling from Databases—A Survey," Mar. 22, 1994, pp. 1-54.

Frank Olken, "Random Sampling from Databases," 1993, 172 pages.

Frank Olken et al., "Random Sampling from B+ trees," Proceedings of the International Conference on Very Large Data Bases, Amsterdam, 1989, 9 pages.

Dan E. Willard, "Optimal Sample Cost Residues for Differential Database Batch Query Problems," Journal of the Association for Computing Machinery, vol. 38. No. 1, Jan. 1991, pp. 104-119.

Sumit Ganguly et al., "Bifocal Sampling for Skew-Resistant Join Size Estimation,"ACM SIGMOD '96, Montreal, Canada, ACM, 1996, pp. 271-281.

Peter J. Haas et al., "Fixed-Precision Estimation of Join Selectivity," ACM, PODS, May 1993, Washingotn, D.C., pp. 190-201.

Yi-Leh Wu et al., "Applying the Golden Rule of Sampling for Query Estimation," ACM SIGMOD 2001, May 21-24 Santa Barbara, California, pp. 449-460.

Peter J. Haas et al., "On the Relative Cost of Sampling for Join Selectivity Estimation," SIGMOD/PODS '94, May 1994, Minneapolis, Minnesota, pp. 14-24.

Peter J. Haas et al., "Sequential Sampling Procedures for Query Size Estimation," 1992 ACM SIGMOD, Jun. 1992, pp. 341-350.

Richard J. Lipton et al., "Practical Selectivity Estimation through Adaptive Sampling," 1990, ACM, pp. 1-11.

* cited by examiner

FIG. 1

Query 202

Select nvl(sum(c1),0), nvl(sum(c2),0)
From (Select 1 as c1
            case when name like "%SMITH%" then 1 else 0 end as c2
      From person sample block(2, 1) seed (1) person)

Sampled rows 210

| C1 | C2 |
|----|----|
| 1 | 0 |
| 1 | 1 |
| 1 | 1 |
| 1 | 0 |
| 1 | 1 |
| 1 | 0 |
| 1 | 1 |
| 1 | 0 |
| 1 | 1 | sum  9    5 number of rows sampled number of rows that match predicate

"Query with two or more predicates, in a conjunction, that reference the same table"

Query QB1

```
select * from vehicles where
    make = "Toyota" and
    model = "Corola"
```

"Query generated to produce statistics from which the individual and combined selectivities of the predicates may be computed."

Query 402

```
Select nvl(sum(c1),0), nvl(sum(c2),0), nvl(sum(c3),0), nvl(sum(c4),0)
    From (Select 1 as c1
              case when make = "Toyota" and model = "Corola" then 1
                  else 0 end as c2
              case when make = "Toyota"  then 1 else 0 end as c3
              case when model = "Corola" then 1else 0 end as c4
              From vehicles sample block(2, 1) seed (1) vehicles))
```

FIG. 4

"Query with an equality predicate based on an expression applied to a column containing unique values. While the column values are unique, the uniqueness of the expression is uncertain."

Query 501

Select * from emp where
    sqrt(empno) = 50

"Query generated to test uniqueness of expression sqrt(empno) = 50."

Query 502

Select nvl(sum(c1),0), nvl(sum(c2),0), count(Distinct c3)
    From (Select 1 as c1
        case when sqrt(empno) = 50 then 1 else 0 end as c2
        sqrt(empno) as c3
        From emp sample block(2, 1) seed (1) emp))

"If in the results of the query nvl(sum(c1).0) = count(distinct 3) and nvl(sum(c2),0) = 1, then the expression may be presumed to be unique for each row in the table."

FIG. 5

"Query that contains a join predicate."

Query 601

Select count(*) from emp, dept where
emp.edeptno = dept.deptno

"Query generated to produce statistics about columns involved in the join."

Query 602

Select nvl(sum(c1),0), count(Distinct c2),
           nvl(sum(case when c2 is null then 1 else 0 end),0)
From (select 1 as c1, emp.edeptno as c2
      From emp sample block(2, 8) seed (1) emp))

OPTIMIZER DYNAMIC SAMPLING

FIELD OF THE INVENTION

The present invention relates to database management systems (DBMS), and in particular, optimization of queries executed by a database system.

BACKGROUND OF THE INVENTION

In a DBMS, data is stored in one or more data containers, each container contains records, and the data within each record is organized into one or more fields. In relational database systems, the data containers are referred to as tables, the records are referred to as rows, and the fields are referred to as columns. In object oriented databases, the data containers are referred to as object classes, the records are referred to as objects, and the fields are referred to as attributes. Other database architectures may use other terminology.

The present invention is not limited to any particular type of data container or database architecture. However, for the purpose of explanation, the examples and the terminology used herein shall be that typically associated with relational databases. Thus, the terms "table", "row" and "column" shall be used herein to refer respectively to the data container, record, and field.

A DBMS retrieves and manipulates data in response to receiving a database statement. Typically the database statement conforms to a database language, such as Structured Query Language (SQL). A database statement can specify a query operation, a data manipulation operation, or a combination thereof. A database statement that specifies a query operation is referred to herein as a query. The present invention is not limited to database statements that specify a particular type of operation. However, for the purpose of explanation, embodiments of present invention are illustrated using queries.

When a DBMS receives a query, the DBMS may generate an execution plan. An execution plan is important—it defines the steps and operations performed by a DBMS to carry out a request. DBMSs generate execution plans that are optimized for efficiency. When determining what steps to include in an execution plan, and the order in which the steps are performed, a DBMS accounts for many factors that affect efficiency.

For example, a query may request rows that contain a first value in a first column and a second value in a second column. If the first column is indexed, then a DBMS may generate an execution plan that uses the index to access data more efficiently. Such an execution plan may include the following steps, executed in the order indicated below.

1. Traverse the index and generate row ids of rows that contain the first value in the first column.
2. Obtain the set of rows identified by the row ids.
3. Filter the set of rows for the second value in the second column.

To determine an efficient execution plan for a query, the query optimizer relies on persistently stored table statistics to estimate the costs of alternative execution plans, and chooses the plan with the lowest estimated cost. The table statistics are computed and stored before the query is received. Table statistics are used to estimate important optimizer cost parameters such as selectivities of predicates and predicate clauses (i.e., the fraction or percentage of rows in a table that match some condition). Examples of table statistics include table cardinalities (the number of rows in a table), the number of distinct values for a column, the minimum and maximum value in the column, and histograms, which is data that specifies the distribution of values in the columns, i.e., the number of rows that have particular column values for a column or the number of rows that have a column value that falls within a range.

For some database statements, table statistics needed by the query optimizer may not be available, as might be the case when an application creates a temporary table only for the duration of the application and fails to collect table statistics on the table. Table statistics may also be out of date, for example, if many rows have been updated, inserted or deleted since the table statistics were computed.

Finally, table statistics may not be sufficient to estimate optimizer cost parameters accurately because of the complexity of expressions in the query, or because the table statistics are used to compute selectivities in a way whose accuracy depends on assumptions which may be invalid, such as the assumption of the independence of values which are actually correlated. All of these situations can result in the optimizer making poor cost estimations based on inaccurately computed selectivities, causing a poorly performing access plan to be selected, as illustrated by the following cases.

The following Query B1 illustrates a case where the assumption of independence of values is not valid and can lead to a miscalculation of selectivities.

select*from vehicles where make="Toyota" and model="Corolla"

For purposes of illustration, the table statistics maintained for table vehicles indicate that 10% of the rows in vehicles include the value Toyota in column make and 1% of the rows contain the value Corolla in column model. Thus, the selectivity of the predicate make=Toyota is 0.1 and the selectivity of the predicate model="Corolla" is 0.01. A query optimizer that assumes the values in the columns make and model are independent, computes the selectivity predicate clause in query B1 by computing the product of the selectivities of the constituent predicates, which is 0.001 (i.e. 0.1×0.01). However, the values in columns make and model are not independent, but are instead correlated. All Corollas are Toyota. Consequently, using the predicate make="Toyota" in a conjunction with the predicate model="Corolla" adds nothing to the selectivity of the predicate clause in query B1. By assuming independence of values, the query optimizer has inaccurately calculated selectivity.

Query B2 illustrates a case where selectivity may not be accurately calculated because predicates in database statements are too complex to calculate using available table statistics.

select*from person where name like "% SMITH %"

For purposes of illustration, histograms for column name indicate the distribution of values that fall within ranges, specifically, indicate the number of rows that have a value in name that falls within a certain range. The predicate name like "% SMITH %" is true for all values in name that match the wild card expression "% SMITH %", that is, contain the text SMITH anywhere between the first and last character of the value. Any number of values in any one of the ranges could match the expression. It may not be possible to determine any selectivity based on table statistics available for name.

Query B3 illustrates yet another case where selectivity may not be accurately calculated because predicates in database statements are too complex to calculate using available table statistics.

select*from product where
price>2*cost

For purposes of illustration, a histogram for column price and cost indicate the distribution of rows for particular values in the columns, i.e., the number of rows in which a particular value occurs in a column. Whether a row satisfies the predicate price>2*cost depends on the values in the columns price and cost and whether they satisfy the stated condition. It is not possible to calculate the number of rows that satisfy the predicate based on data in the histogram.

While it may be possible to generate and maintain table statistics for rows that meet conditions that depend on one or more columns, there are so many possible combinations of columns that theoretically could be of interest that precomputing statistical information about each such combination in most cases is unrealistic. A more realistic approach would be to precompute statistics for certain combination of columns that have appeared in actual queries issued by users based on, for example, some workload that has been recorded. However, even this approach has severe drawbacks:

1. It does not help the "out-of-the-box" behavior, i.e., when the system does not yet have a recorded history of queries.
2. It does not help in "ad-hoc" query environments where new queries that have not previously been used are generated frequently.

An approach to estimating predicate selectivities when they cannot be estimated or estimated reliably based on available table statistics is referred to as dynamic sampling. This technique is based on the idea of efficiently retrieving a subset of the rows of a table—a sample—and, based on that sample, estimating properties of the table and/or query. Dynamic sampling is used by a query optimizer to dynamically estimate predicate selectivities and statistics based on the specific needs of the optimizer for the database statement currently being optimized. Dynamic sampling undertaken to estimate the selectivity of a particular predicate or combination of predicates in a query is referred to herein as predicate sampling.

In dynamic sampling, when a database statement that contains predicates is received by a database server, the query optimizer generates and submits a query that randomly samples rows, evaluates the predicates against the rows, and computes sample statistics, such as the number of rows that satisfy the predicates and the number of rows sampled. The results returned by the sampling query are used by the optimizer to more accurately estimate predicate selectivities and statistics about the table, both of which allow the query optimizer to more accurately estimate execution plan costs and generate more efficient execution plans.

For example, while analyzing query B1, a query optimizer generates a query, issued to evaluate the predicate of query B1, make="Toyota" and model="Corolla", for a randomly selected subset of rows. The results indicate that 1000 rows were sampled and of the sampled rows, 1% satisfied the predicate.

Unfortunately, executing a query to dynamically sample data requires additional resources such as CPU usage and possibly increased physical disk reads. For many queries, the benefits realized by using dynamic sampling to improve query optimization are outweighed by the overhead incurred to perform dynamic sampling.

Based on the foregoing, it is clearly desirable to provide a mechanism that reduces the overhead incurred to implement dynamic sampling for query optimization.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for query optimization is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Described herein are approaches to implementing dynamic sampling in a way that lessens or eliminates the additional overhead incurred to perform dynamic sampling. Also described are techniques for determining characteristics about predicates not previously determined by conventional techniques for dynamic sampling.

Dynamic sampling is used by a query optimizer to dynamically estimate predicate selectivities and statistics. When a database statement is received by a database server, an initial analysis of the database statement is made to determine the efficacy of dynamic sampling, that is, to determine whether optimization of the query would benefit from dynamic sampling and whether performance is not excessively impacted by the dynamic sampling process. If this analysis determines dynamic sampling should be used, then dynamic sampling is undertaken.

A query issued by a query optimizer in order to gather information using dynamic sampling is referred to herein as a recursive sampling query.

Two-pass Optimization

Figure 1:
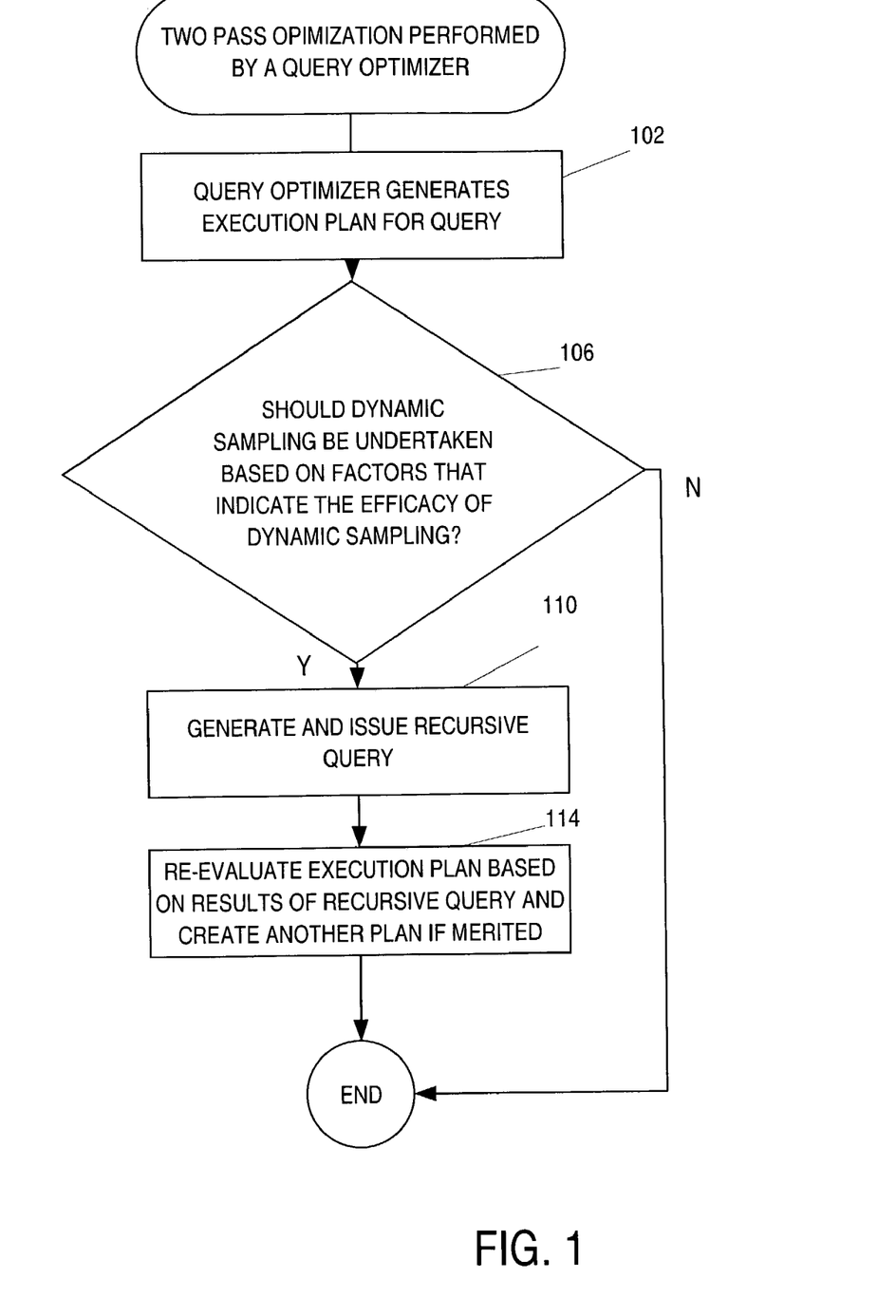
FIG. 1 is a flowchart depicting a process that may be used for query sampling according to an embodiment of the present invention.

FIG. 1 is a flowchart of a query optimization process that uses dynamic sampling according to an embodiment of the present invention. The process is referred to as two-pass optimization because first an optimized plan is generated in a first pass and another possibly better plan is generated in a second pass based on the results of dynamic sampling.

Referring to FIG. 1, at step 102, the query optimizer generates an initial execution plan for a query.

At step 106, the query optimizer determines whether to undertake dynamic sampling based on factors that indicate the efficacy of dynamic sampling. The purpose of this determination is to determine whether dynamic sampling could yield a benefit that justifies the overhead incurred to perform dynamic sampling. Furthermore, because an initial execution plan has been constructed without dynamic sampling, properties of that plan can be accounted before when deciding whether accept the overhead associated with dynamic sampling. The overhead of dynamic sampling can be compared to the cost of various expensive operations in the initial execution plan and thereby determine the significance of the overhead. One approach is to consider the tables that would be accessed through full scans in the initial execution plan and compute the total number of disk blocks that would be accessed during the full scans. That number can then be compared to the number of disk blocks that would be accessed during dynamic sampling, thereby determining whether a second pass with dynamic sampling would have any significant impact on the response time of the query. Various approaches, criteria, heuristics may be applied to make the determination of whether to undertake dynamic sampling based on factors that indicate the efficacy of dynamic sampling.

At step 110, a recursive query is generated and issued.

At step 114, the execution plan generated at step 102 is re-evaluated based on the results of the recursive query; another one is generated if it is determined that a more efficient execution plan can be generated based on the results. For example, the initial execution plan may include steps for scanning rows from a first table and filtering those rows based on a predicate that has a particular selectivity. The filtered rows are then joined in subsequent steps with rows from a second table, the resulting rows of which are joined with rows from a third table. There are also steps for scanning rows from the third table and filtering them based on another predicate that has a particular selectivity. The initial execution plan was optimized to initially join the first table with the second because the selectivity of the predicate for the first table was higher than that of the third table. However, dynamic sampling results indicate otherwise. Therefore, another execution plan is generated that first joins rows from the third table and second table.

Determining When to Sample

As mentioned before, various heuristics, factors, and criteria may be applied and considered to determine when to undertake sampling. Examples of factors that disfavor undertaking dynamic sampling include:

1. An execution plan involves scanning only a small number of rows. A database server may determine the number of rows that are being scanned by examining the execution plan. The plan may, for example, scan a small table.

2. The original execution plan could potentially be executed very fast due to the use of predicates with potentially high selectivity. For instance, the plan may involve a scan of an index driven by an equality predicate.

Examples of factors that favor undertaking dynamic sampling include:

1. An execution plan may involve scanning a very large table with a large number of rows, and thus merits dynamic sampling.

2. A query may require access to tables for which no table statistics have been generated. Tables for which no table statistics have been generated are referred to as "unanalyzed" tables, while a table for which table statistics have been generated are referred to as "analyzed" tables. Dynamic sampling may be undertaken when a query references an unanalyzed table.

The dynamic sampling undertaken when a query references unanalyzed tables may be designed to produce general statistics that reflect all data in a table, such as the number of rows in unanalyzed tables, the number of null values or unique values in a column, and in particular, a column referenced in the query in issue. This type of sampling is distinguishable from predicate sampling in that it produces results and sampling statistics about the table while predicate sampling produces results and sampling statistics that reflect selectivity of a particular predicate. The ability to generate general statistics through dynamic sampling is particularly advantageous for optimizing queries that reference unanalyzed tables.

Also, user configurable parameters allow a user to control if and how aggressively to undertake dynamic sampling. For example, a user configurable parameter can specify, a number along a scale that indicates if and how aggressively to undertake dynamic sampling, as follows:

0—no dynamic sampling performed.
1—Use dynamic sampling only for unanalyzed tables without indexes.
2—Use dynamic sampling for any unanalyzed table.
3—Use dynamic sampling when the query optimizer cannot reliably estimate predicate selectivity.
4—Use dynamic sampling when there are multiple predicates for the same table (to account for correlation effects, for example, between data in multiple columns of the table).

Alternatively, a separate user configurable parameter is provided that affects how many rows are sampled. Sampling a larger number of rows improves accuracy but creates greater overhead.

Illustrative Recursive Query

Figure 2:
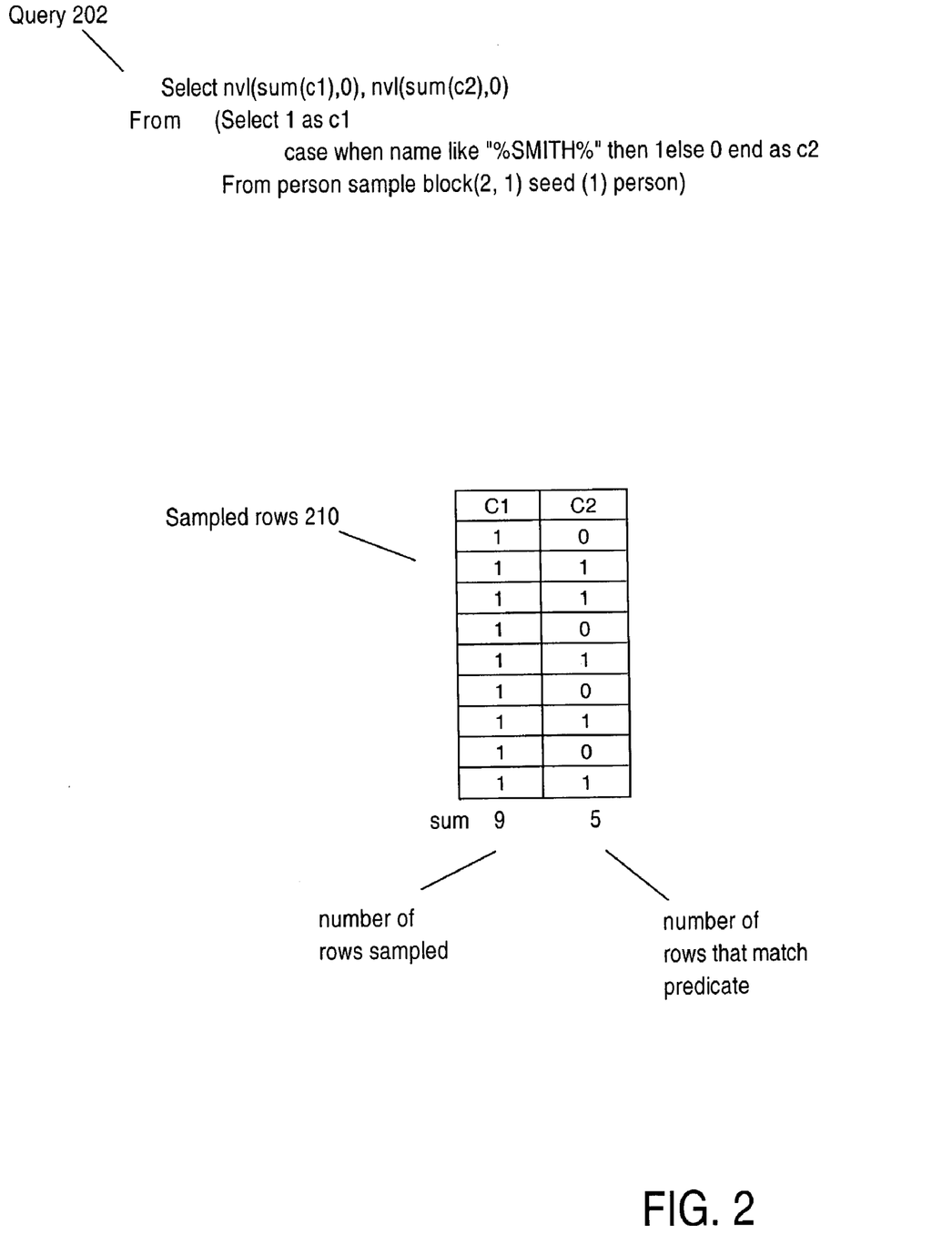
FIG. 2 is a diagram showing a recursive query and the results of a recursive query that are used to generated statistics for optimizing a query according to an embodiment of the present invention.

FIG. 2 shows a recursive query 202, which is used to illustrate how a recursive query can be constructed and how its results can be used to determine statistics, including general statistics and the selectivity of a predicate. Sampled rows 210 show the rows sampled for the recursive query 202.

Recursive query 202 contains an outer query and an inner query. The inner query specifies how to select the rows to sample from table person. Within the inner query, the clause sample block(2,1) specifies to sample 2% of data blocks for the table in sets of 1 block. The clause seed(1) specifies the seed value (i.e. 1) for a random number generator used by the database server to randomly select blocks to sample.

The inner query specifies that 1 is returned as the value for column c1 for all rows. For column c2, the case clause within recursive query 202 generates a value for c2 that indicates whether or not a particular sampled row satisfies the predicate name like "% SMITH %". For rows that satisfy the predicate, the value in column c2 is 1; for the other rows the value is 0.

The functions sum(c1) and sum(c2) in the outer query of query 202 specify to compute the sum of the values in the columns c1 and c2, respectively. Because c1 is always 1 for any row in the sampled rows 210, the computed sum for c1 is the number of rows sampled. Because the column c2 contains the value 1 for rows that satisfy the sampled predicate and 0 for the other rows, the computed sum for c2 is the number of rows from the sampled rows 210 that satisfy the predicate. The respective sums for c1 and c2 are 9 and 5.

The operator nvl( . . . ,0) (e.g. nvl(sum(c1),0) ) is not part of the ANSI standard for SQL. Operator nvl( . . . ,0) returns 0 if sum( . . . ) is NULL or the value of sum( . . . ) if the value is not NULL. The operator can be expressed in ANSI standard SQL as case when sum( . . . ) is NULL then 0 else sum( . . . ) end.

From these sums, general statistics and statistics particular to the query's predicate are computed as follows:

Predicate selectivity: 0.56 Calculated by dividing the number of rows that satisfy the sampling predicate by the number of rows sampled, i.e. dividing the sum of c2 by c1 in recursive query 202, which is 5 divided by 9.

Table Cardinality: 450 Calculated by dividing the number of rows sampled by the specified percentage of blocks requested for the sample, which is 9 divided by 2%.

Result Cardinality: 256 Calculated by multiplying the table cardinality by the selectivity.

The term sample size refers to an amount of data to dynamical sample. Such an amount may be expressed using various units of measure, such as data blocks or rows. A sample clause is used to specify the sample size as a percentage of data blocks in a table. For purposes of efficiency, it is desirable to use sample sizes that are limited to absolute numbers of blocks (e.g. 32) rather than relative numbers, such as a percentage. To specify a sample size that is limited to an absolute number using sample clauses which express sample sizes as a percentage, the percentage that corresponds to a particular absolute number is calculated. This calculation is based on the absolute number of blocks desired for the sample size and the number of blocks in the table. For example, if the desired sample size is 32 blocks and a table contains 100 data blocks, then the percentage to specify in the sample clause is 0.32, that is, sample block (0.32,1). The number of data blocks used to store data for a table is stored as a statistic or may be derived from database metadata describing storage structures for the table.

The sample clause may also be used to specify that a certain percentage of a table's rows are to be sampled. Dynamic sampling in which rows are selected to sample rather than blocks is referred to as row-based sampling. Dynamic sampling in which blocks are selected rather than rows is referred to as block-based sampling.

Sampling with Highly selective Predicates

In general, dynamic sampling that indicates that only a small number of rows satisfy a condition is less reliable than dynamic sampling that indicates a larger number of rows satisfy a condition. For example, when an estimate of selectivity has an absolute margin error of ±2%, the relative margin of error is greater for selectivity estimates of 1% than for selectivity estimates of 50%. Given the absolute margin of error ±%2, a plan selected on the basis of a 50% estimation of selectivity might lead to processing 4% more rows than estimated. A plan selected on the basis of a 1% estimation of selectivity might process three times as many rows than estimated. Had the true magnitude of the selectivity been known, then a more efficient execution plan would have been chosen. For DBMSs, such as data warehouses, in which a query can access billions of rows, such errors can be very expensive, particularly when more efficient available execution plans are foregone in favor of less efficient ones.

According to an embodiment, cases where the estimate of predicate selectivity is extremely high are handled in a variety of ways. Among them is the "less than 1% rule", which is a heuristic that operates as follows. If the sampling results indicate no rows satisfy a predicate, rather than taking this result literally and assuming that the selectivity of the predicate is zero, the selectivity of the predicate is assumed to be numerically less than a certain percentage or upper bound. The particular upper bound used may be based on the sample size. For example, sample results indicate no rows satisfy a predicate. Assume that the selectivity estimate based on sampling is 1 percent and that the estimate based on available table statistics is 5 percent. Because 5% exceeds the upper bound, the predicate selectivity used is the midpoint between the lower and upper bounds, 0% and 1%, namely 0.5%. However, if the estimate of predicate selectivity based on available table statistics is 0.3%, which is less than the upper bound, then the predicate selectivity used is 0.3%.

Iterative Sampling

Iterative sampling is another measure that may be used when faced with a very low and therefore less reliable estimate of predicate selectivity. In iterative sampling, when the sampling results of an initial recursive query indicate no or very few rows satisfy a predicate, then either a second query is issued to sample a greater number of rows to generate a potentially more reliable estimate, or an "index probe" is performed to count the actual number of rows that satisfy the predicate.

An index probe is an operation that counts the number of rows that satisfy a condition by scanning an index to determine which rows satisfy the condition. Some query optimizers will generate execution plans that include one or more steps that perform an index probe. The query optimizer generates the execution plan when a query contains a predicate and the computation of which rows satisfy the condition can be made by scanning only an index. In general, the condition is based on a column ("key") that has been indexed. The index can be traversed very quickly to determine which rows contain a key value that satisfies the predicate. An index probe can be initiated by issuing a query that causes a query optimizer to generate an execution plan that includes an index probe e.g. issuing a query that includes an equality predicate based on a key.

To illustrate how an index probe may be used in iterative sampling, the following query QS is provided.

select*from emp where
salary>150,000

The results of the initial recursive query indicate that only one row in the sample satisfies the predicate salary>150,000. Because the salary column is indexed, the query optimizer generates the following recursive query QSR that forces an index probe that counts the number of rows that satisfy the predicate salary>150,000.

```
select count(emp) from emp where
salary>150,000
```

The selectivity of the predicate salary>150,000 is determined from the resultant count generated by QSR and the cardinality of table emp. The cardinality may be estimated based on table statistics or the results of dynamic sampling, as explained previously.

Determining Whether to Increase Sampling or Perform an Index Probe

Figure 3:
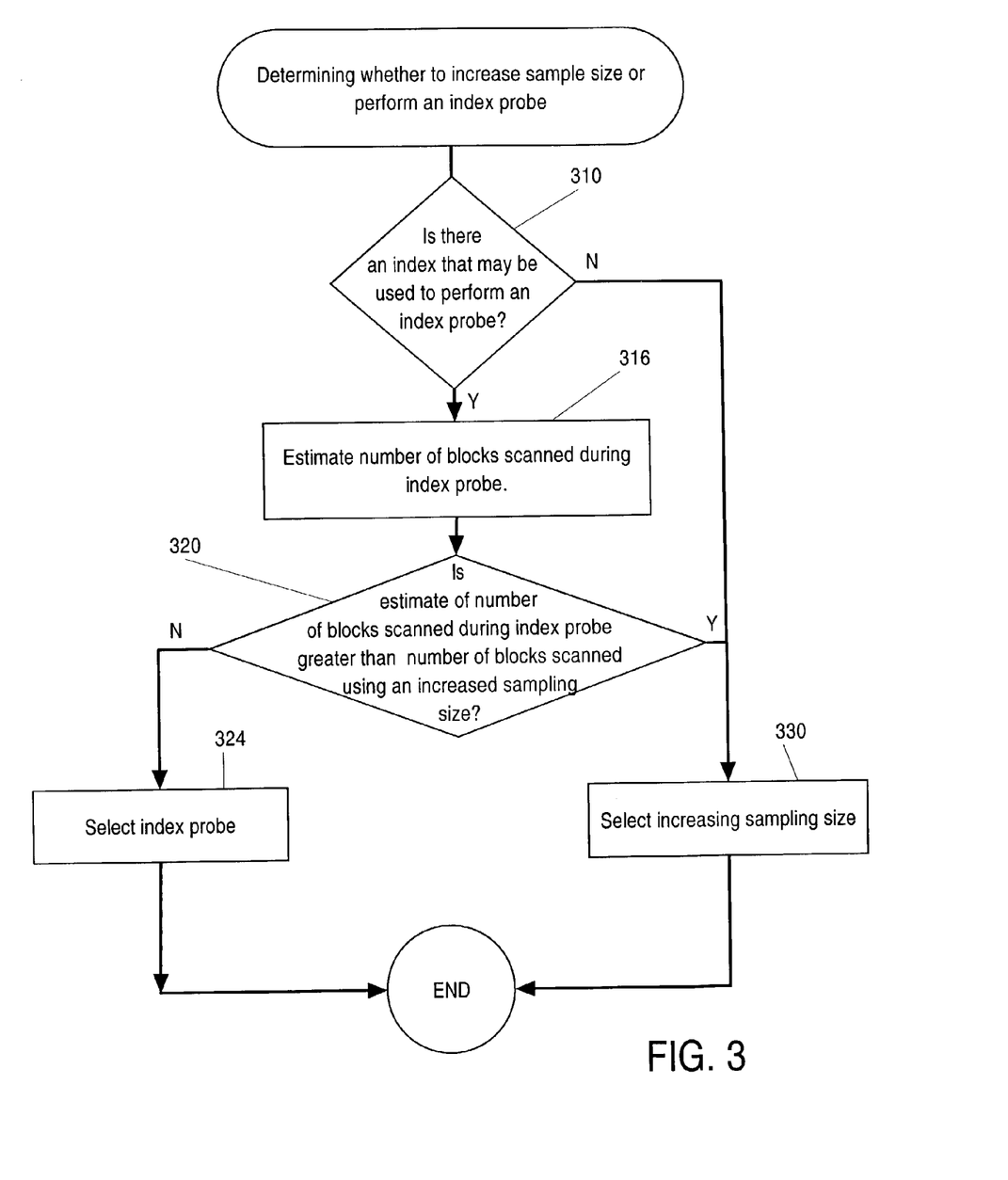
FIG. 3 is a flowchart depicting a process for determining when it is beneficial to perform an index probe according to an embodiment of the present invention.

An index probe cannot be performed if there is no available index available from which the selectivity of a particular condition may be computed. In addition, an index probe, while being a relatively efficient way of generating an actual count of rows that satisfy a particular condition, may nevertheless require scanning numerous blocks if the index to probe indexes a very large table. As a result, more blocks could be scanned than would otherwise be to execute a recursive query with an increased sample size. Therefore, there is need for a process that determines whether to increase sample size or to perform an index probe. The fact that the original sample showed so few rows satisfying the predicate can be used determine an estimate or upper bound on the cost of scanning an index for all the rows that actually match a predicate. FIG. 3 is a flow chart showing a process that may performed by a query optimizer for this purpose according to an embodiment of the present invention.

Referring to FIG. 3, at step 310, a query optimizer determines whether there is an index that may be used to perform an index probe to generate a count of the number rows that satisfy the sampled predicate. For example, an index of column salary for table emp may be used to perform an index probe to generate a count of the number of rows that satisfy the predicate salary>150,000 because the key of the index is the column salary and a count of the rows that satisfy the predicate may be made by examining the entries that index rows to key values that satisfy the predicate. The index may be, for example, a b-tree index or a bitmap index.

At step 316, the optimizer estimates the number of blocks that would be scanned during an index probe. This estimate may be made by multiplying the number of blocks in the index by the estimated selectivity of the sample predicate. The estimated selectivity can be derived from the results of the table statistics or the results of the initial recursive query, including the application of the "less than 1% rule".

At step 320, the query optimizer determines whether or not the estimate of the blocks that would be scanned during an index probe is greater than the number of blocks scanned using the increased sample size. If so, then execution proceeds to step 330, where increasing the sample size is selected. Otherwise, an index probe is selected at step 324.

Dynamic Sampling where More then One Predicate References a Table

A query may contain multiple predicates in a conjunction that are referencing the same table, each predicate referencing a particular column of the table. As mentioned before with respect to query QB1 (see BACKGROUND section), even though available table statistics may be used to calculate the combined selectivity of the predicates, the estimation may not be accurate because the values in the columns are not independent. To more accurately assess the combined selectivity, dynamic sampling may be used to assess the selectivity of the predicates, alone and in combination.

Figure 4:
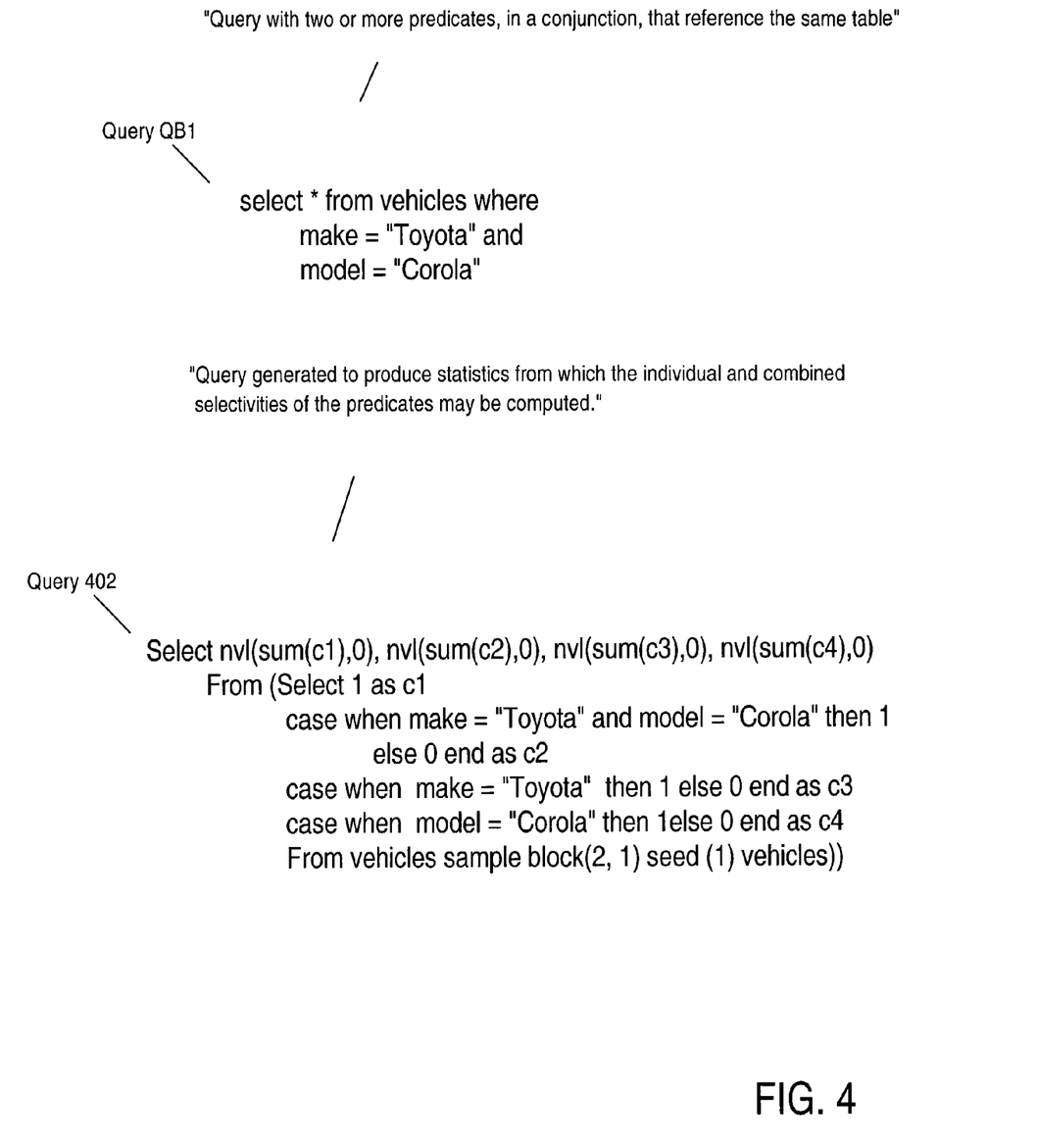
FIG. 4 is a diagram depicting a recursive query and the query for which the recursive query is generated according to an embodiment of the present invention.

Referring to FIG. 4, it shows query QB1 and query 402, a recursive query generated during and for the optimization of query QB1. The results of query 402 include nvl(sum (c1),0), which is the number of the rows sampled, and nvl(sum(c2),0), which is the number of rows that satisfy the conjunction make="Toyota" and model="Corolla", nvl(sum (c3),0), which is the number of rows that satisfy the predicate make="Toyota", and nvl(sum(c4),0), which is the number of rows that satisfy the predicate model="Corolla".

Note the fact that a query contains predicates that reference the same table in this way can be a factor favoring undertaking dynamic sampling at step 106.

Dynamic Sampling to Determine Whether Uniqueness of a Unique Column Preserved A table column may contain values that are unique. Such columns are referred to as unique columns. In general, equality based predicates based on such columns are very selective. To illustrate this point, the following query QU is provided.

```
select*from emp where
empno=50
```

Column empno contains employee numbers, which are unique values that identify a particular employee. Only one row in table emp contains a particular employee number. The predicate empno=50 can only be satisfied by at most one row and is therefore highly selective.

A predicate, such as an equality predicate, may include an expression that has a unique column as an operand or argument. Examples of such predicates include empno+ 50=100 or foo(empno)=700. An expression that has a unique column as an operand or argument is referred to herein as a predicate based on a unique column. There is no guarantee that an expression based on a unique column evaluates to a unique value itself. For example, an expression may evaluate to the same value for a set of unique column values because of rounding e.g. empno/5. Dynamic sampling may be used to determine whether uniqueness of unique columns is preserved for expressions based on unique columns, that is, whether or not the expressions evaluate to values that are themselves unique.

Figure 5:
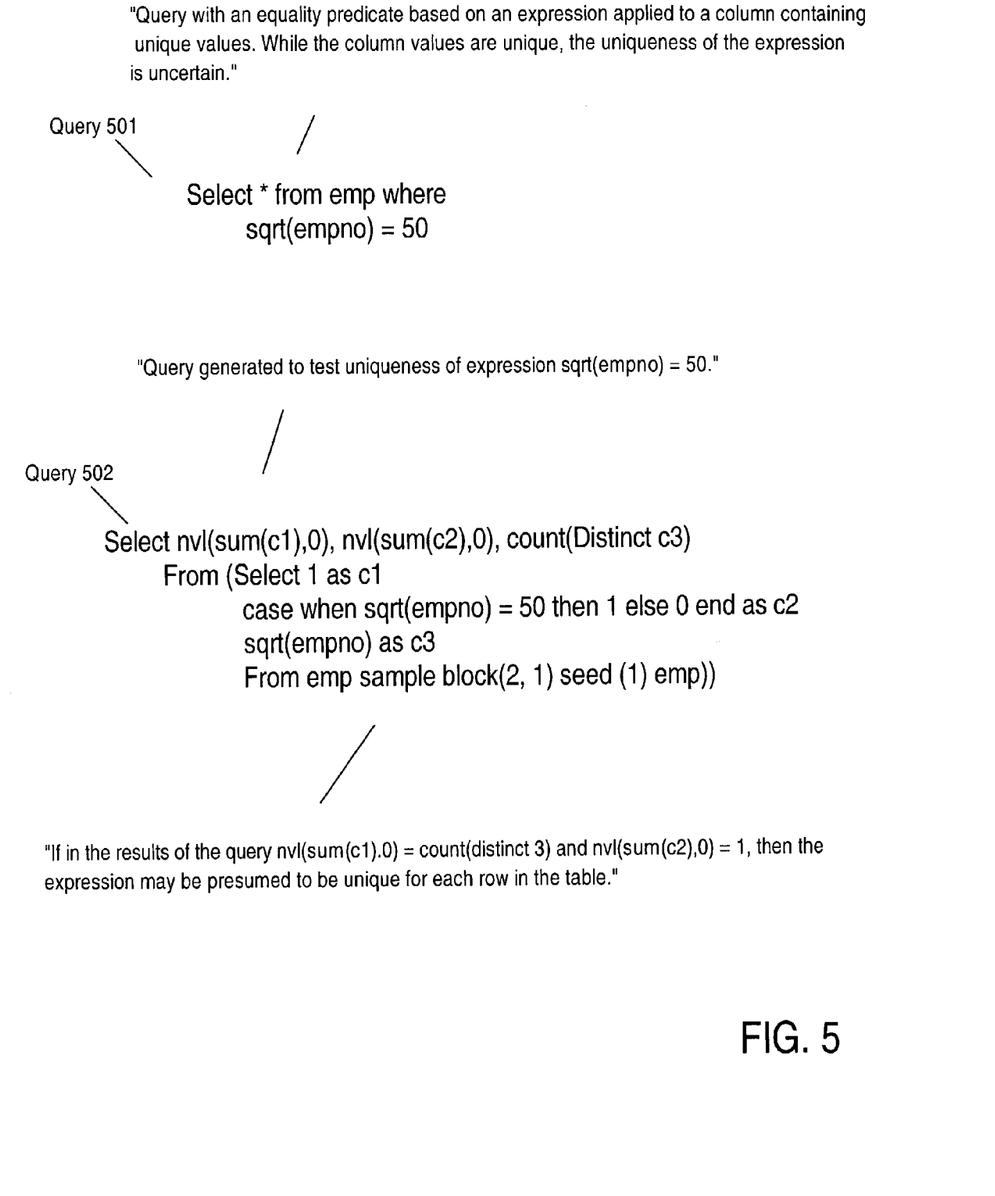
FIG. 5 is a diagram depicting a recursive query and the query for which the recursive query is generated according to an embodiment of the present invention.

FIG. 5 shows a recursive query that includes a predicate that tests the uniqueness of an expression, where the expression operates on a unique column. Referring to FIG. 5, it shows query 501. Query 501 contains the predicate expression sqrt(empno)=50, which operates on the unique column empno. Recursive query 502 is a recursive query whose results are used to gauge the uniqueness of the expression sqrt(empno)=50. The results of query 502 include nvl(sum (c1),0), which is the number of the rows sampled, nvl(sum (c2),0), which is the number of rows where the expression sqrt(empno)=50 is TRUE, and count(Distinct c3), which is the number of distinct values for the expression sqrt (empno)×50.

A result that meets the criteria list below indicates that the expression is unique for all rows in table emp. If the results meet the criteria, the query optimizer may then evaluate execution plans based on the assumption.

1. The number of distinct values is equal to the number of rows sampled.
2. Because the expression sqrt(empno)=50 is an equality expression, the number of rows in which sqrt(empno)= 50 is TRUE should be 0 or 1.

Note the fact that a query contains a predicate based on a unique column can be a factor favoring undertaking dynamic sampling at step 106.

Join Predicates

Figure 6:
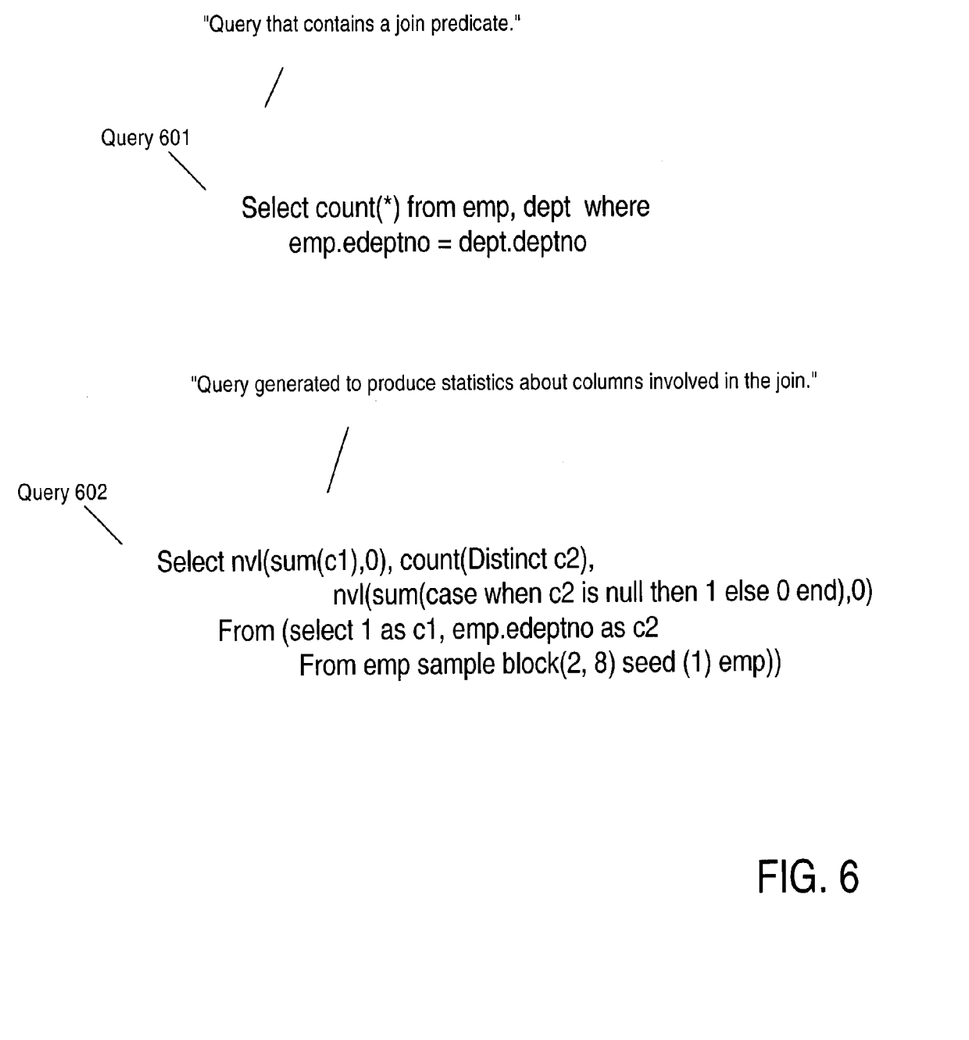
FIG. 6 is a diagram depicting a recursive query and the query for which the recursive query is generated according to an embodiment of the present invention.

Join predicates are predicates that specify join conditions for performing join operations. Join predicates refer to columns in more than one table. Such columns are referred to herein as join columns. Dynamic sampling may be used to generate statistics about join columns, which may be useful to evaluating execution plans for join tables. FIG. 6 shows a recursive query that requests data from which statistics are derived about one or more of the join columns in a query.

Referring to FIG. 6, it shows query 601, which specifies a join between tables emp and table dept based on the join predicate emp.edeptno=dept.deptno. Recursive query 602 requests information about the join column emp.edeptno.

The results of query 602 include nvl(sum(c1),0), which is the number of rows sampled, and count(Distinct c3), which is the number of distinct values for the column emp.edeptno, and nvl(sum(case when c3 is null then 1 else 0 end),0), which is the number of rows containing null values. From this information, the query optimizer can estimate the cardinality of table emp, the number of distinct values in column emp.edeptno for all of table emp, and the number of rows having NULL values in column emp.edeptno.

Intelligent Allocation of Sampling Cost Between Accessing Metadata and Table Data Executing a query requires not only accessing data stored in tables but also accessing metadata describing those tables. Thus, executing a query uses resources (e.g. CPU processing time, disk inputs and outputs, memory) to not only access table data but also the metadata describing those tables. As shown above, the determination to perform dynamic sampling may be based on assumptions about the resource cost incurred to execute recursive queries and the fact that as a result of incurring the costs a meaningful amount of sampled data is realized. Thus, effectively determining when to undertake dynamic sampling depends on the accuracy of these estimates and the ability to assure that a portion of resources used to execute a recursive query are spent accessing the table data needed for sampling.

Described herein is an approach to accurately and intelligently divide the cost of executing a recursive query between accessing table data and metadata. The approach is illustrated in the context of partitioned tables. However, an embodiment of the present invention is not so limited.

A partitioned table is divided up into sub-tables, referred to as "partitions". The most common form of partitioning is referred to range partitioning. With range partitioning, each individual partition corresponds to a particular range of values for one or more columns of the table. For example, the date column of a table sales may store date values, and the table may be divided into multiple partitions, each of which corresponds to a particular month of a particular year. All rows that have a date value for a particular month in the date column are inserted into the partition that corresponds to that month. For example, rows in sales that have a date value of May 1, 1996 and May 31, 1996 in column date are inserted into the partition for May 1996, rows in sales that have a date value of May 1, 1995 and May 31, 1995 in column date would be inserted into another partition for May 1995.

Partitioning a table can increase the efficiency of processing queries that select rows based on the date column through a process referred to as partition pruning. In partition pruning, only partitions that contain rows that can satisfy predicates in a query are accessed to compute the query. For example, if a particular query selects all rows where date is greater than May 31, 1996, then only the partitions associated with the months June 1996 and beyond need be scanned.

A query that accesses a partitioned table can potentially access thousands of partitions; a recursive query issued to optimize such a query can potentially access many if not all of these partitions. Each partition accessed by the recursive query requires accessing metadata describing the partition to, for example, count the number of blocks in the partition. Generally, each access requires reading at least one data block. Hence, the overhead of retrieving the metadata for each partition could be significant, and as costly as sampling the table data itself, in the case where only a single block of table data is sampled for a particular partition. If the total allowable overhead of dynamic sampling puts a limit on the number of disk reads that can be performed, those disk reads need to be distributed intelligently between metadata and table data.

According to an embodiment of the present invention, the access cost for accessing the partition metadata is accounted for when assessing the access cost of computing a recursive query. The access cost of computing the recursive query is divided between accessing the partition metadata and the data in the partitions. A determination is made of the number of partitions that could be potentially accessed, accounting for partition pruning when appropriate. If the number of partitions that would be accessed would cause the cost allocated to accessing partition metadata to be exceeded, then the query is further modified to limit the cost of accessing partition metadata. To limit access cost to the partition metadata, the recursive query is generated so that only a subset of the table's partitions are accessed to compute the query. The number of partitions in the subset is based on the desired access cost for partition metadata. The member partitions of the subset are selected randomly. If through partition pruning only a subgroup of table partitions need be accessed, then the members selected for the subset are selected from the subgroup. For purposes of illustration, the following query QP is provided.

select*from sales where
    date>='Jun. 1, 1996' and
    amt>1000

As mentioned before, sales is partitioned into partitions that correspond to a particular month, each partition holding the rows with a date value that falls within a corresponding month. When executing a recursive query to sample the predicate amt>1000 in query QP, assume that it is desired to limit the number of data blocks accessed to 32 blocks. It is further desired that block accesses be evenly divided between accessing blocks holding partition metadata and blocks holding data to sample. Thus, the access cost may be divided such that 16 blocks are accessed for partition metadata and 16 blocks are accessed for sampling data. Assuming that to access a partition one data block holding partition metadata is also accessed, then a recursive query is created such that the sample size is 16 blocks. Furthermore, the 16 partitions to access are selected randomly among the partitions for months June 1996 and greater. Accordingly, the results of the recursive query reflect the selectivity of the data in the partitions for months June 1996 and greater.

Hardware Overview

Figure 7:
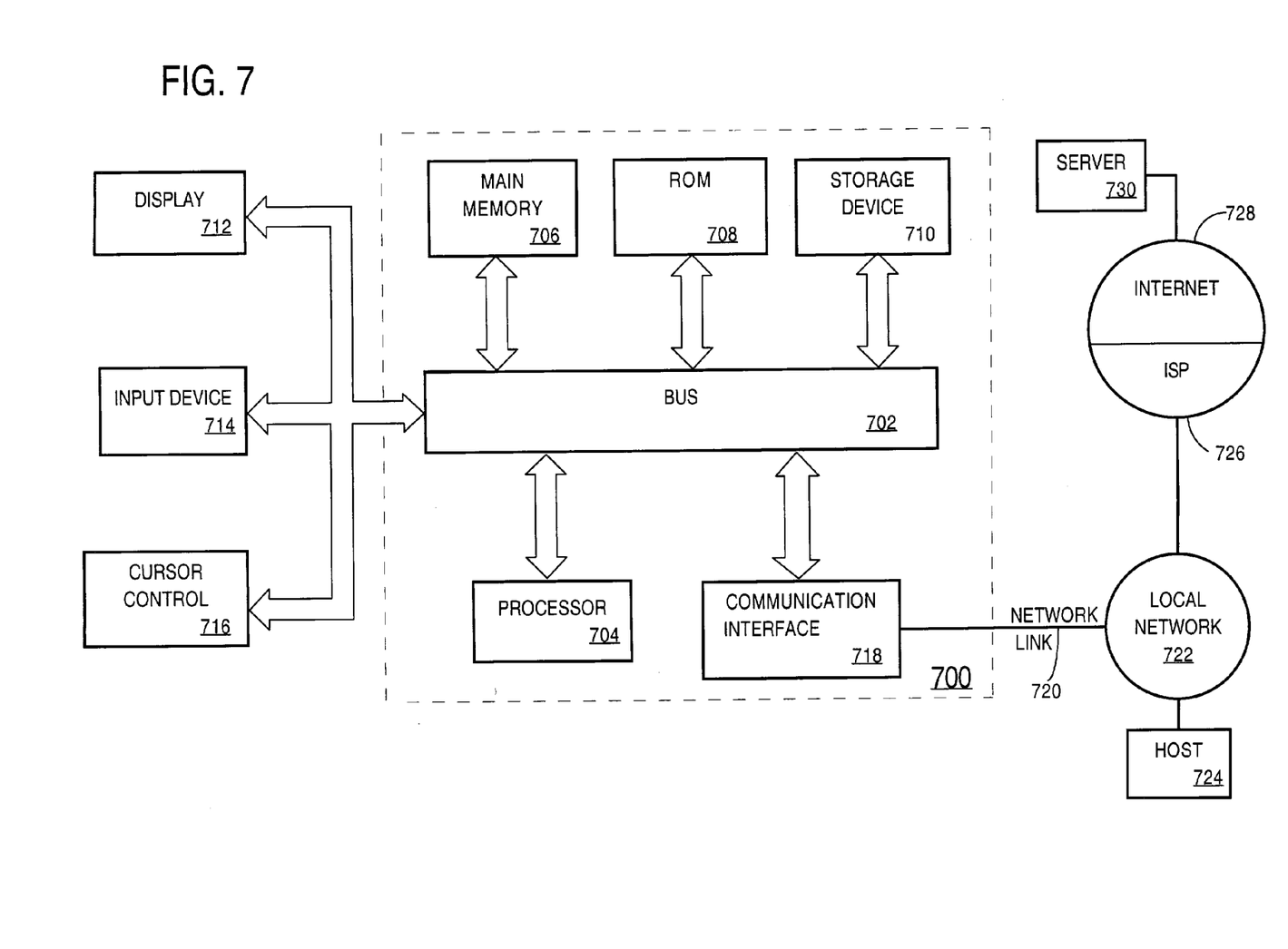
FIG. 7 is a block diagram depicting a computer system which may be used to implement an embodiment of the present invention.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method used for optimizing queries, the method comprising the computer-implemented steps of:

receiving a first query that requires access to a first table;

generating a first execution plan for executing said first query;

based on a set of one or more factors, determining whether to execute another query to access a subset of rows as a sample from said first table and to generate results used to evaluate efficiency of execution plans for executing said first query;

wherein said one or more factors include at least one factor that reflects the efficacy of executing said other query to evaluate the efficiency of execution plans for executing said first query;

if, based on said one or more factors, it is determined the other query should be executed, then issuing said other query to generate first results;

generating a second execution plan for executing said first query based on said first results.

2. The method of claim 1, wherein:

said first query includes a predicate; and the step of issuing said other query includes issuing said other query to generate statistics that reflect application of said predicate to a portion of the rows in said first table.

3. The method of claim 2, wherein the step of generating statistics includes generating statistics that reflect the selectivity of said predicate.

4. The method of claim 2, wherein:

said predicate references join columns; and the step of generating statistics includes generating statistics about at least one of said join columns.

5. The method of claim 1, wherein:

said first query requires access to a first column in said first table;

said first column contains unique values that are each unique relative to all other values in the first column;

said first query contains a predicate that is based on a first expression;

said first expression is based on said first column; and the computer-implemented steps further include determining whether said first results indicate, for a subset of rows in the first table, whether said first expression is unique for each row of said subset relative to the other rows in said subset.

6. The method of claim 1, wherein said other query accesses a first subset of the rows of said first table;

wherein said first results indicate the portion of rows in said first subset that satisfy a predicate in said first query; and if said portion is greater than a threshold, then:

computing an estimate of the selectivity of the predicate based on the first results, and performing the step of generating a second execution plan based on said estimate.

7. The method of claim 6, wherein the computer-implemented steps further include:

when said portion is not greater than said threshold:

establishing a default value as the estimate of the selectivity of the predicate; and performing the step of generating a second execution plan based on said estimate.

8. The method of claim 6, wherein the computer-implemented steps further include:

when said portion is not greater than said threshold, generating a third query to evaluate the efficiency of execution plans for executing said first query, wherein said third query is generated to access a second subset of rows that contains more rows than said first subset.

9. The method of claim 6, wherein the computer-implemented steps further include:

when said portion is not greater than said threshold, causing traversing of an index to determine a number of rows in said first table that satisfy the predicate.

10. The method of claim 9, wherein the computer-implemented steps further include:

estimating a first amount of data that is accessed to perform the step of traversing;

determining that said first amount is less than an amount of data that would be accessed by executing a version of said other query that accesses a greater number of rows than the number of rows in said first subset; and in response to determining that said first amount is less, performing the step of traversing.

11. The method of claim 1, wherein the one or more factors include one or more of the following:

the first query requires access to at least one table for which no persistently stored statistics are available;

the at least one table has no indexes;

the at least one table stores more database data than would be accessed by executing said other query; and the first query includes two or more predicates that access said at least one table.

12. A computer-implemented method used for optimizing queries, the method comprising the computer-implemented steps of:

receiving a first query that requires access to a table;

in response to receiving said first query, generating another query to generate results that are used to evaluate the efficiency of execution plans for executing said first query;

wherein said first query requires access to a first column in said table;

wherein said first column contains unique values that are each unique relative to all other values in the first column;

wherein said first query contains a predicate that is based on a expression;

wherein said expression is based on said first column;

making a determination of whether said results indicate, for a subset of rows in the table, whether said expression is unique for each row of said subset relative to the other rows in said subset; and generating data representing said determination.

13. A computer-implemented method used for optimizing queries, the method comprising the computer-implemented steps of:

receiving a first query that requires access to a table and that includes a predicate;

in response to receiving said first query, generating another query to generate results that are used to evaluate the efficiency of execution plans for executing said first query;

wherein said other query accesses a subset of the rows of said table;

determining the portion of rows in said subset that satisfy said predicate; and if said portion is not greater than a threshold, then:
  establishing a default value as an estimate of the selectivity of the predicate; and
  based on said estimate, generating an execution plan for executing said first query.

14. A computer-implemented method used for optimizing queries, the method comprising the computer-implemented steps of:
  receiving a first query that requires access to a table and that includes a predicate;
  in response to receiving said first query, generating another query to generate results that are used to evaluate the efficiency of execution plans for executing said first query;
  wherein said other query accesses a first subset of the rows of said table;
  determining the portion of rows in said first subset that satisfy said predicate; and
  if said portion is not greater than a threshold, then:
    causing traversal of an index to determine a number of rows in said table that satisfy the predicate, and
    generating data that represents said number of rows in said table that satisfy the predicate.

15. A computer-implemented method used for performing dynamic sampling to optimize queries, the method comprising the computer-implemented steps of:
  receiving a first query that requires access to a table;
  in response to receiving said first query, generating another query to generate results that are used to evaluate the efficiency of execution plans for executing said first query;
  wherein execution of said other query:
    uses resources;
    entails access to first data stored in said table and to metadata describing said table;
  making a determination of how to divide said resources between accessing said first data and accessing said metadata; and
  wherein the step of generating said other query includes generating said other query so that said execution of said other query uses said resources according to said determination.

16. The method of claim 15, wherein:
  said table includes a plurality of table partitions;
  said metadata includes partition metadata describing said table partitions;
  the step of generating said other query includes:
    determining a number of table partitions to access based on a number of accesses to the partition metadata expected during execution of said other query, and
    generating said other query to cause said execution of said other query to access said number of partitions.

17. A computer-readable medium storing one or more sequences of instructions which, when executed by one or more processors, causes the one or more processors to perform the method recited in claim 1.

18. A computer-readable medium storing one or more sequences of instructions which, when executed by one or more processors, causes the one or more processors to perform the method recited in claim 2.

19. A computer-readable medium storing one or more sequences of instructions which, when executed by one or more processors, causes the one or more processors to perform the method recited in claim 3.

20. A computer-readable medium storing one or more sequences of instructions which, when executed by one or more processors, causes the one or more processors to perform the method recited in claim 4.

21. A computer-readable medium storing one or more sequences of instructions which, when executed by one or more processors, causes the one or more processors to perform the method recited in claim 5.

22. A computer-readable medium storing one or more sequences of instructions which, when executed by one or more processors, causes the one or more processors to perform the method recited in claim 6.

23. A computer-readable medium storing one or more sequences of instructions which, when executed by one or more processors, causes the one or more processors to perform the method recited in claim 7.

24. A computer-readable medium storing one or more sequences of instructions which, when executed by one or more processors, causes the one or more processors to perform the method recited in claim 8.

25. A computer-readable medium storing one or more sequences of instructions which, when executed by one or more processors, causes the one or more processors to perform the method recited in claim 9.

26. A computer-readable medium storing one or more sequences of instructions which, when executed by one or more processors, causes the one or more processors to perform the method recited in claim 10.

27. A computer-readable medium storing one or more sequences of instructions which, when executed by one or more processors, causes the one or more processors to perform the method recited in claim 11.

28. A computer-readable medium storing one or more sequences of instructions which, when executed by one or more processors, causes the one or more processors to perform the method recited in claim 12.

29. A computer-readable medium storing one or more sequences of instructions which, when executed by one or more processors, causes the one or more processors to perform the method recited in claim 13.

30. A computer-readable medium storing one or more sequences of instructions which, when executed by one or more processors, causes the one or more processors to perform the method recited in claim 14.

31. A computer-readable medium storing one or more sequences of instructions which, when executed by one or more processors, causes the one or more processors to perform the method recited in claim 15.

32. A computer-readable medium storing one or more sequences of instructions which, when executed by one or more processors, causes the one or more processors to perform the method recited in claim 16.

33. A method used for optimizing queries, the method comprising the steps of:
  receiving a first query that requires access to a first table;
  based on a set of one or more factors, determining whether to execute another query to access a subset of rows as a sample from said first table and to generate results used to evaluate efficiency of execution plans for executing said first query;
  wherein said one or more factors include at least one factor that reflects the efficacy of executing said other query to evaluate the efficiency of execution plans for executing said first query;
  if, based on said one or more factors, it is determined the other query should be executed, then:
    issuing said other query to generate first results, and generating a second execution plan for executing said first query based on said first results.

34. The method of claim 33, further comprising the steps of:
before determining whether to execute said another query, generating information about a certain execution plan for said first query; and
wherein said one or more factors are based on said information about a certain execution plan.

35. A computer-readable storage medium storing one or more sequences of instructions which, when executed by one or more processors, causes the one or more processors to perform the method recited in claim 34.

36. The method of claim 33, wherein:
said first query includes a predicate; and
the step of issuing said other query includes issuing said other query to generate statistics that reflect application of said predicate to a portion of the rows in said first table.

37. The method of claim 36, wherein the step of generating statistics includes generating statistics that reflect the selectivity of said predicate.

38. A computer-readable storage medium storing one or more sequences of instructions which, when executed by one or more processors, causes the one or more processors to perform the method recited in claim 37.

39. The method of claim 36, wherein:
said predicate references join columns; and
the step of generating statistics includes generating statistics about at least one of said join columns.

40. A computer-readable storage medium storing one or more sequences of instructions which, when executed by one or more processors, causes the one or more processors to perform the method recited in claim 39.

41. A computer-readable storage medium storing one or more sequences of instructions which, when executed by one or more processors, causes the one or more processors to perform the method recited in claim 36.

42. The method of claim 33, wherein:
said first query requires access to a first column in said first table;
said first column contains unique values that are each unique relative to all other values in the first column;
said first query contains a predicate that is based on a first expression;
said first expression is based on said first column; and
the computer-implemented steps further include determining whether said first results indicate, for a subset of rows in the first table, whether said first expression is unique for each row of said subset relative to the other rows in said subset.

43. A computer-readable storage medium storing one or more sequences of instructions which, when executed by one or more processors, causes the one or more processors to perform the method recited in claim 42.

44. The method of claim 33,
wherein said other query accesses a first subset of the rows of said first table;
wherein said first results indicate the portion of rows in said first subset that satisfy a predicate in said first query; and
if said portion is greater than a threshold, then:
computing an estimate of the selectivity of the predicate based on the first results, and
performing the step of generating a second execution plan based on said estimate.

45. The method of claim 44, wherein the computer-implemented steps further include:
when said portion is not greater than said threshold:
establishing a default value as the estimate of the selectivity of the predicate; and
performing the step of generating a second execution plan based on said estimate.

46. A computer-readable storage medium storing one or more sequences of instructions which, when executed by one or more processors, causes the one or more processors to perform the method recited in claim 45.

47. The method of claim 44, wherein the computer-implemented steps further include:
when said portion is not greater than said threshold, generating a third query to evaluate the efficiency of execution plans for executing said first query, wherein said third query is generated to access a second subset of rows that contains more rows than said first subset.

48. A computer-readable storage medium storing one or more sequences of instructions which, when executed by one or more processors, causes the one or more processors to perform the method recited in claim 47.

49. The method of claim 44, wherein the computer-implemented steps further include:
when said portion is not greater than said threshold, causing traversing of an index to determine a number of rows in said first table that satisfy the predicate.

50. The method of claim 49, wherein the computer-implemented steps further include:
estimating a first amount of data that is accessed to perform the step of traversing;
determining that said first amount is less than an amount of data that would be accessed by executing a version of said other query that accesses a greater number of rows than the number of rows in said first subset; and
in response to determining that said first amount is less, performing the step of traversing.

51. A computer-readable storage medium storing one or more sequences of instructions which, when executed by one or more processors, causes the one or more processors to perform the method recited in claim 50.

52. A computer-readable storage medium storing one or more sequences of instructions which, when executed by one or more processors, causes the one or more processors to perform the method recited in claim 49.

53. A computer-readable storage medium storing one or more sequences of instructions which, when executed by one or more processors, causes the one or more processors to perform the method recited in claim 44.

54. The method of claim 33, wherein the one or more factors include one or more of the following:
the first query requires access to at least one table for which no persistently stored statistics are available;
the at least one table has no indexes;
the at least one table stores more database data than would be accessed by executing said other query; and
the first query includes two or more predicates that access said at least one table.

55. A computer-readable storage medium storing one or more sequences of instructions which, when executed by one or more processors, causes the one or more processors to perform the method recited in claim 54.

56. A computer-readable storage medium storing one or more sequences of instructions which, when executed by one or more processors, causes the one or more processors to perform the method recited in claim 33.

* * * * *

UNITED STATES PATENT AND TRADEMARK OFFICE
CERTIFICATE OF CORRECTION

| | | |
|---|---|---|
| PATENT NO. | : 7,213,012 B2 | Page 1 of 1 |
| APPLICATION NO. | : 10/435228 | |
| DATED | : May 1, 2007 | |
| INVENTOR(S) | : Hakan Jakobsson | |

It is certified that error appears in the above-identified patent and that said Letters Patent is hereby corrected as shown below:

(56) References Cited

Please delete "6,745,652" and insert --6,754,652--.

COLUMN 15
Claim 1: Lines 21-22: Delete "then issuing said other query to generate first results;" and insert --then: issuing said other query to generate first results; and--.

Signed and Sealed this

Fourteenth Day of August, 2007

JON W. DUDAS
*Director of the United States Patent and Trademark Office*